(No Model.)

J. DAIN, Jr.
HORSE HAY RAKE.

No. 262,011. Patented Aug. 1, 1882.

WITNESSES:
Fred. G. Dieterich
P. C. Dieterich

INVENTOR.
J. Dain Jr.
by C. A. Snow & Co
ATTORNEYS.

UNITED STATES PATENT OFFICE.

JOSEPH DAIN, JR., OF MEADVILLE, ASSIGNOR TO JOHN H. ONSTOTT AND JOHN COOMBS, OF SPRINGFIELD, MISSOURI.

HORSE HAY-RAKE.

SPECIFICATION forming part of Letters Patent No. 262,011, dated August 1, 1882.

Application filed April 6, 1882. (No model.)

*To all whom it may concern:*

Be it known that I, JOSEPH DAIN, Jr., of Meadville, in the county of Linn and State of Missouri, have invented certain new and useful Improvements in Horse Hay-Rakes; and I do hereby declare that the following is a full, clear, and exact description of the invention, which will enable others skilled in the art to which it appertains to make and use the same, reference being had to the accompanying drawings, which form a part of this specification.

Figure 1:
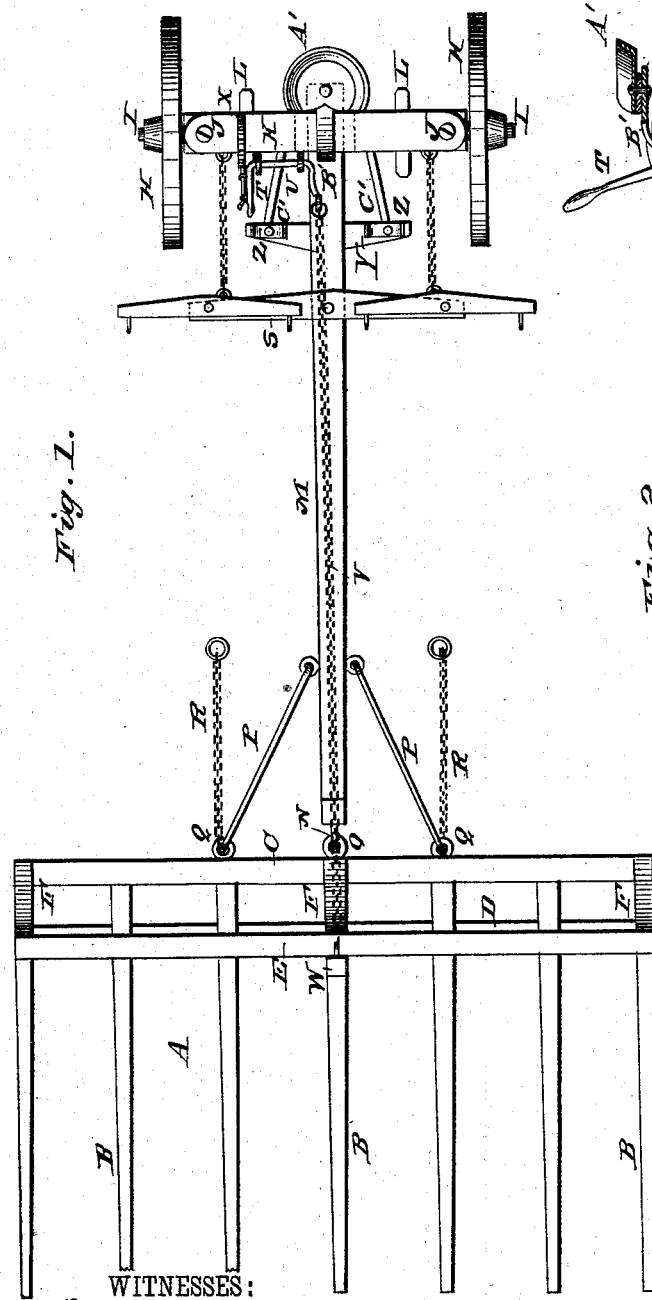
Figure 2:
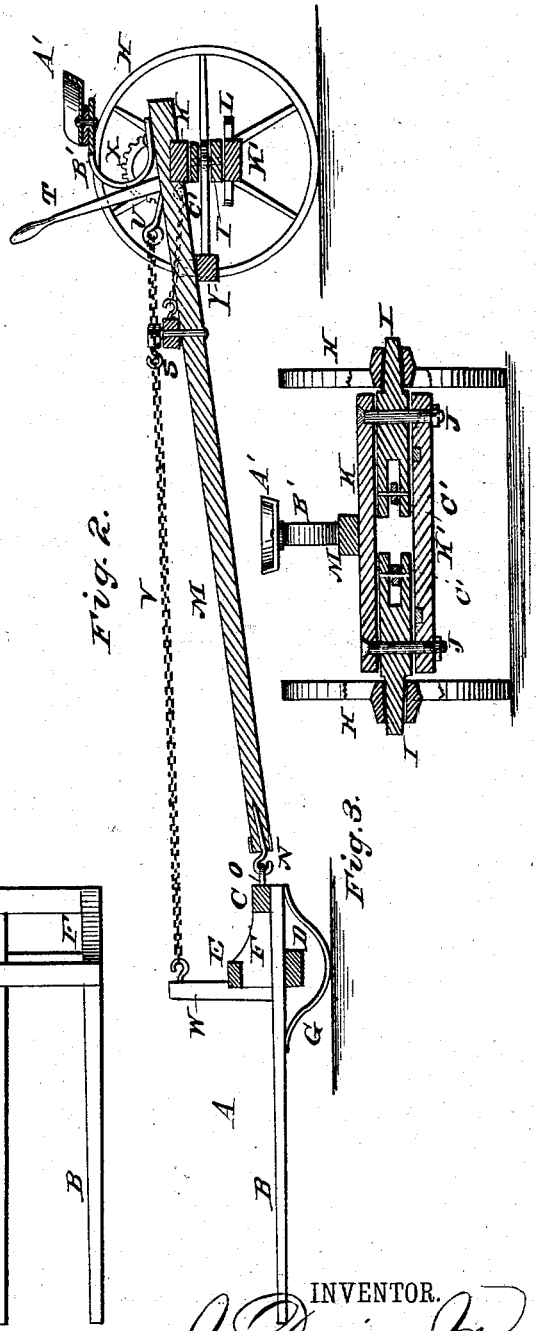
Figure 3:
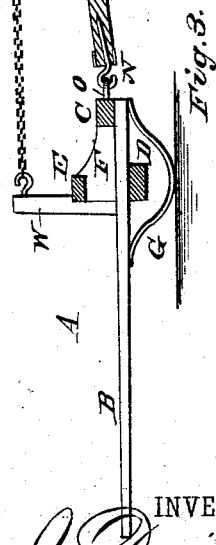

Figure 1 is a top plan of my improved hay-rake. Fig. 2 is a longitudinal sectional view, and Fig. 3 is a vertical cross-section taken through the axle.

Corresponding parts in the several figures are denoted by like letters of reference.

This invention relates to horse hay-rakes; and it consists in certain improvements in the construction of the same, which will be hereinafter fully described, and particularly pointed out in the claim.

In the drawings hereto annexed, A represents the rake, which consists of teeth B, connected by a cross-bar, C, at their rear and a cross-bar, D, near their rear ends, the former being secured to the upper and the latter to the under side of said teeth.

E is an additional cross or head piece, secured to flanges or supports F on the outer and middle rake-teeth, as shown.

The rake is mounted upon runners G, secured to the under side of two of the teeth B.

H H represent a pair of wheels, mounted upon stub-axles I I, which are pivoted upon vertical bolts J, connecting the beams K K', which constitute the main axle of the device. The pivoting-bolts J are located near the extreme ends of the axle K K', beyond which the stub-axles project but a short distance, so that the inner ends of said stub-axles shall have considerable leverage. Cross-pieces L are secured to the upper side of the under axle-beam, K', to afford supports and guides for the pivoted stub-axles.

M is the tongue, which is secured to the upper axle-beam, K, and provided with a hook, N, by which it may be connected with the rake-head by an eyebolt, O, in the rear side of the latter.

P P are hooked rods or braces, which are likewise connected to eyebolts Q on the rear side of the rake-head, said rods being attached to the tongue near its front end, as shown. Breast-chains R for the horses are attached to the eyebolts Q, and a double-tree, S, of ordinary construction, is secured to the tongue.

T is a lever pivoted to the upper axle-beam, K, and having a crank-arm, U, connected by a chain, V, with the upper end of an upright, W, secured to the central rake-tooth, B, flanges F, and cross-bar E.

It will be seen that by manipulating the lever T the points of the rake-teeth may be raised from the ground for the purpose of clearing obstructions and carrying a load to the stacking-place. The lever T may be retained in any position to which it may be adjusted by a suitably-constructed catch, X.

Y is a cross-piece pivoted under the tongue M, and provided at its ends with swiveled foot-rests Z for the driver, whose seat A' is mounted upon a spring-bar, B', secured upon the rear end of the tongue. The ends of the cross-piece Y are connected by pivoted rods C' with the inner ends of the stub-axles I, which may thus be manipulated and controlled.

The operation and advantages of my invention will be readily understood from the foregoing description, taken in connection with the drawings hereto annexed.

The rake may be readily controlled by means of the lever T, and by means of the foot-bar Y and intermediate mechanism the wheels may be instantaneously turned to any desired angle with the axle, thereby turning the machine and guiding it in any direction, while at the same time the driver is left the free use of both hands.

I am aware of the patent to Noyes, No. 255,658, March 28, 1882, and I claim nothing therein shown.

I am also aware that it is common in running-gear to provide wheels mounted upon adjustable stub-axles, and this I do not broadly claim.

Having thus described my invention, I claim and desire to secure by Letters Patent of the United States—

The combination of the axle consisting of parallel beams K K', the stub-axles I, pivoted between said beams and having wheels H, the cross-pieces L, forming supports and guides for said stub-axles, the tongue M, pivoted cross-bar Y, having swiveled foot-rests Z, pivoted rods C', connecting the ends of the cross-bar with the inner ends of the stub-axles, and the rake A, connected to the front end of the tongue, substantially as set forth.

In testimony that I claim the foregoing as my own I have hereto affixed my signature in presence of two witnesses.

JOSEPH DAIN, Jr.

Witnesses:
  J. R. LITTELL,
  WM. BAGGER.